United States Patent [19]
Grant et al.

[11] Patent Number: 4,805,137
[45] Date of Patent: Feb. 14, 1989

[54] BUS CONTROLLER COMMAND BLOCK PROCESSING SYSTEM

[75] Inventors: John L. Grant; Edward Strachar, both of Colorado Springs, Colo.

[73] Assignee: United Technologies Corporation, Hartford, Conn.

[21] Appl. No.: 1,299

[22] Filed: Jan. 8, 1987

[51] Int. Cl.[4] .............................................. G06F 13/00
[52] U.S. Cl. ........................................................ 364/900
[58] Field of Search ... 364/200 MS File, 900 MS File

[56] References Cited

U.S. PATENT DOCUMENTS

| | | | |
|---|---|---|---|
| 3,740,728 | 6/1973 | Pullen | 364/200 |
| 4,060,849 | 11/1977 | Bienvenu et al. | 364/200 |
| 4,065,810 | 12/1977 | Cramer et al. | 364/200 |
| 4,319,323 | 3/1982 | Ermolovich et al. | 364/200 |
| 4,322,793 | 3/1982 | Andersson et al. | 364/200 |
| 4,451,884 | 5/1984 | Heath et al. | 364/200 |

Primary Examiner—Eddie P. Chan
Attorney, Agent, or Firm—Eric W. Petraske

[57] ABSTRACT

A dual-purpose integrated circuit for use in a MIL-STD-1553B bus system performs the bus-related functions of both the bus controller and of a remote terminal. The circuit incorporates a number of finite-state machines that are programmed by the host CPU to execute one or more series of message transfers with little or no intervention from the CPU.

10 Claims, 8 Drawing Sheets

BUS CONTROLLER COMMAND BLOCK PROCESSING SYSTEM

TECHNICAL FIELD

The field of the invention is that of control of system buses in digital systems, in particular in systems that employ the MIL-STD-1553 bus.

BACKGROUND ART

The 1553 bus has been defined by the Department of Defense as an asynchronous, serial, time division multiplex bus. In a typical 1553 system, there will be one central computer (such as a fire control computer on an airplane) and a number of other units on the bus which are referred to as remote terminals (RT). The detailed bus requirements are defined in a number of available publications, including the MIL-STD 1553 Multiplex Applications Handbook from SCI Systems, Inc., of Huntsville, Ala. The standard also allows for three word formats—command words, data words, and status words, having the obvious functions. The bus standard also provides for three catagories of message formats—message transfers between any two remote terminals (RT to RT), transfers from the bus controller to a particular terminal; mode commands for terminal management; and broadcasts to all remote terminals.

Existing implementations of the functions of the bus controller within the system have been done using hybrid circuits comprising several chips on a printed circuit board. An example of this approach is that of the Data Device Corporation's chip set called BUS-66300, BUS-66305, BUS-66106 and BUS-66111. An important drawback of these and other implementations of the bus controller is that the system CPU (the Central Processing Unit in the main system computer) is required to interact with the bus controller device for every 1553 command that is executed or after a small number of 1553 commands. Since the 1553 bus is a real time bus, in which the bus controller and the remote terminals must respond within strict time constraints, any interaction with the CPU both degrades the response of the system and also serves to load down the central computer. A further load on the central computer is the necessity for the CPU to reconfigure the message sequence that is being sent over the bus in order to respond to events that have sent an interrupt signal to the CPU. Another drawback of some previous systems is that there have been fixed requirements on the memory areas used and the size of those areas. Both of the above problems require more intervention by the CPU.

There has been a long felt need for a subsystem that could take from the CPU the burden of managing the bus and carrying out a programmed sequence of messages and commands over the bus.

DISCLOSURE OF INVENTION

The invention relates to an implementation of a 1553 bus controller that includes the low voltage logic and control functions required by the military standard on a single chip and offloads from the CPU many tasks of managing the bus.

A feature of the invention is that all commands and data relating to 1553 bus messages are stored within the host memory related to the CPU and accessed by the bus controller chip by using DMA techniques.

Another feature of the invention is the provision of a linked list of messages which the bus controller will execute independently of the CPU in a programmed sequence determined by the systems programmer, deviating from the sequence as required only in accordance with commands from the CPU. The linked list of messages corresponds to a linked list of command block areas of memory.

Another feature of the invention is the provision of a dual-purpose chip that may perform the bus interface operations for either a bus controller or a remote terminal and is referred to herein as a BCRT (Bus Controller—Remote Terminal).

Other features and advantages will be apparent from the specification and claims and from the accompanying drawings which illustrate an embodiment of the invention.

BEST MODE OF CARRYING OUT THE INVENTION

Figure 1:
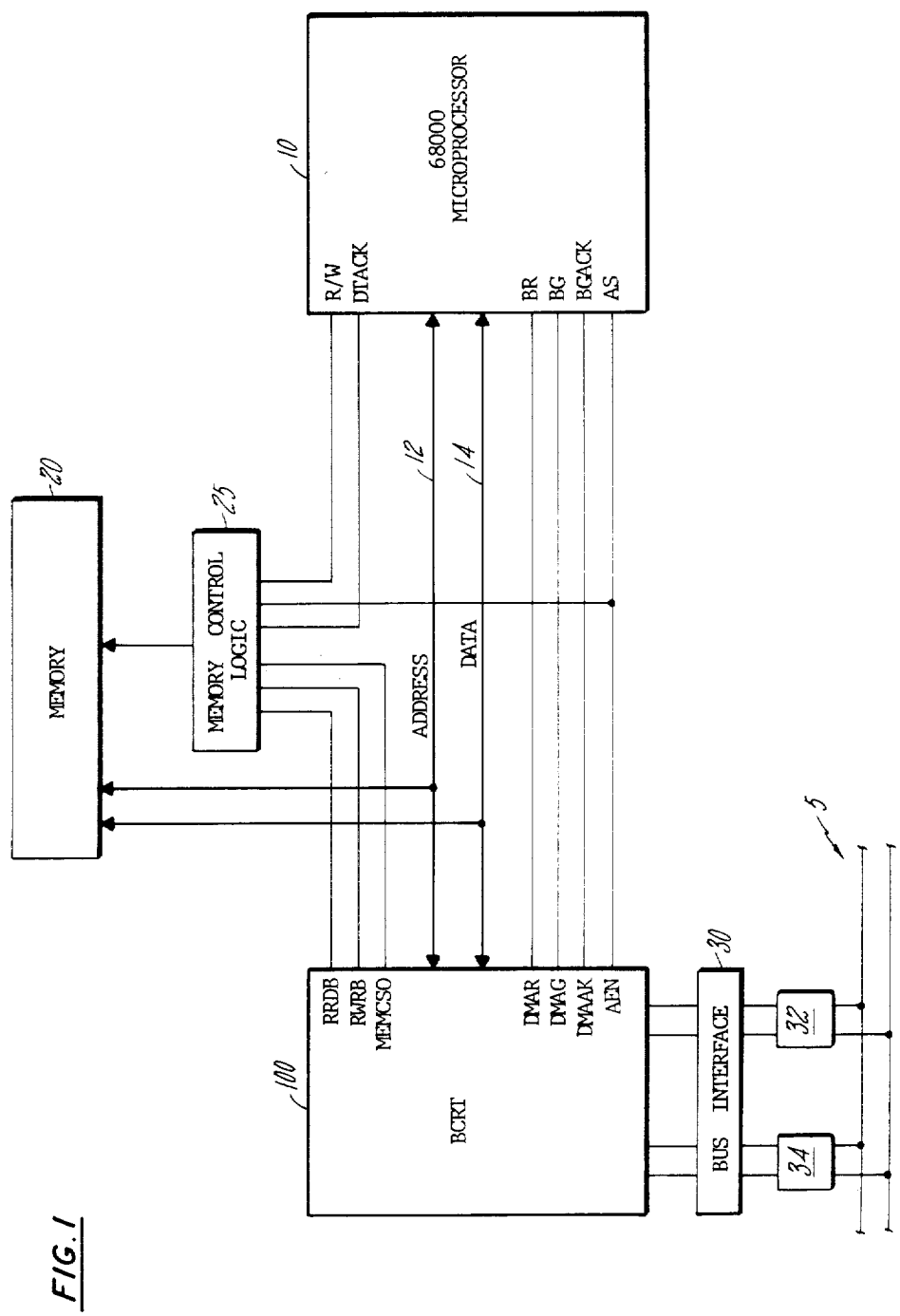
FIG. 1 illustrates a portion of a bus system showing the central CPU, its associated memory, the bus controller chip and an interface to a standard bus.

Referring now to FIG. 1, there is shown schematically a portion of a bus control system constructed according to the invention. In the lower left hand corner, a two wire bus indicated by the numeral 5, is the dual twisted-pair bus required by the 1553 specification. Two transformers 32 and 34 couple signals to the bus. A bus interface unit 30 translates signals from logic levels used on the chip to the mil spec levels required. All of the foregoing are conventional units that are not part of this invention.

On the right of the drawing is a 16 bit microprocessor 10, illustratively a Motorola 68000 microprocessor. This is the central processing unit of the bus of a digital system that employs the 1553 bus. Other systems on the 1553 bus will be referred to as remote terminals (RT), even though they may contain other local CPU's. On the top of the drawing is a memory module 20 which is the host memory associated with the CPU. A conventional memory control logic device 25 receives control signals from both the CPU and from the bus controller chip. CPU 10, memory 20 and memory control 25 are all commercially available units. The invention may be practical with any of a number of embodiments of these units. The bus controller chip of the invention, denoted by the numeral 100, has an address bus 12 and a data bus 14 going to both the memory and to the CPU and control lines also going to both the memory and the CPU. The control signals provided are flexible in order to interface with many units. The CPU may write directly into registers within bus controller 100 in order to initialize the set of tasks to be performed and to modify the set of tasks in accordance with whatever system program the CPU is running. Bus controller 100 sends data to the CPU and also sends data directly into memory 20 using a conventional DMA (direct memory access) procedure.

In operation, bus controller 100 will send commands along bus 5 to various remote units that are part of the system; receive responses from those remote units and ordinarily store responses in memory 20. Subject to flags stored within controller 100 during the initialization procedure by the CPU, controller 100 may transmit data or flags that are referred to as interrupts back to the CPU. An advantage of the direct storing of data in memory unit 20 is that it may be accessed by the CPU 10 as is convenient for the overall system operation. Prior art controllers forced the CPU to interrupt its work in order to handle data.

Bus controller 100 must, of course, carry out all of the functions required by the 1553 standard, including sending commands to individual units, sending broadcast commands, and controlling transfers of messages from one remote unit to another. The advantage of this invention is not only that it accomplishes the functions in a single chip, but that it also reduces the load on the CPU.

Figure 2:
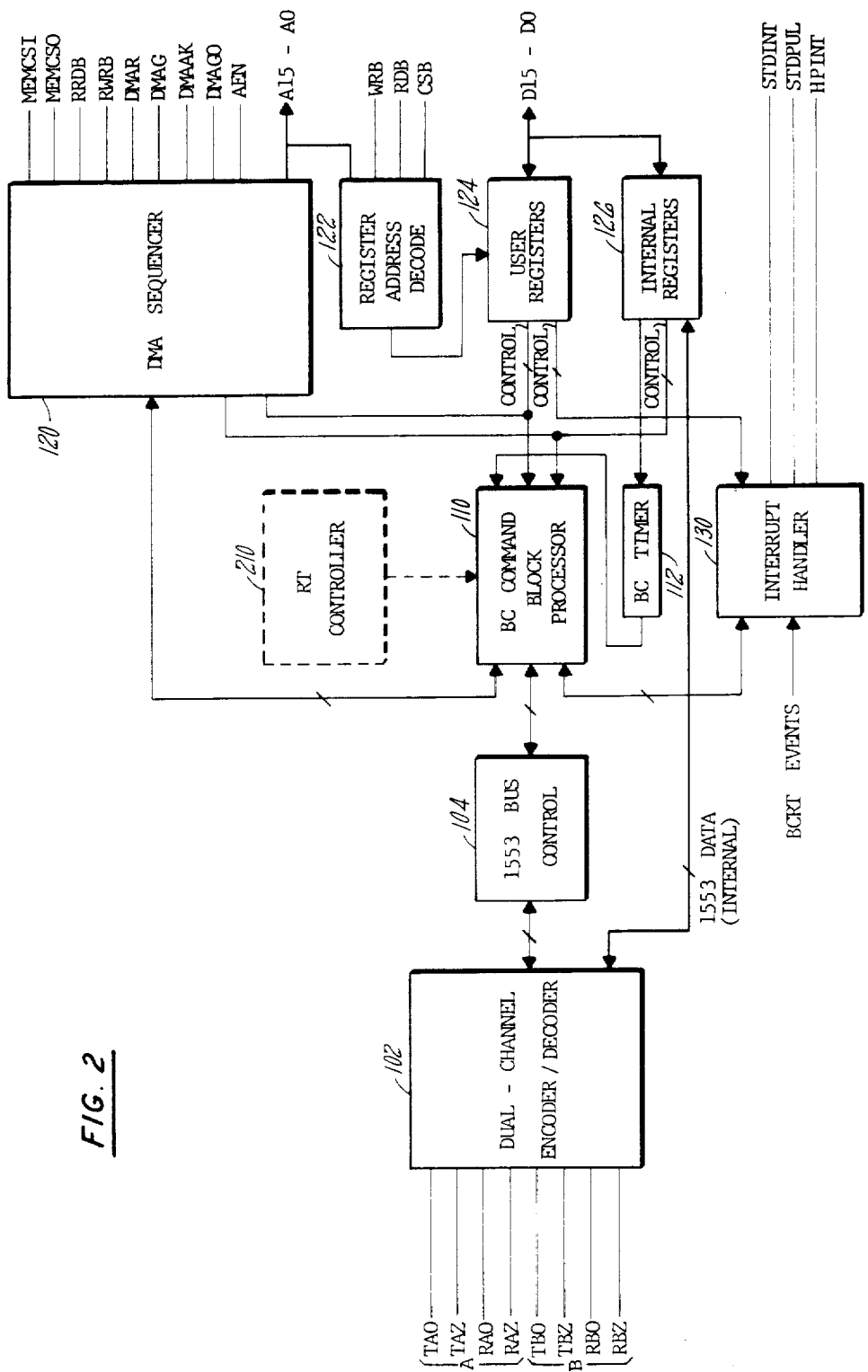
FIG. 2 illustrates a block diagram of a bus controller chip according to the invention.
Figure 3:
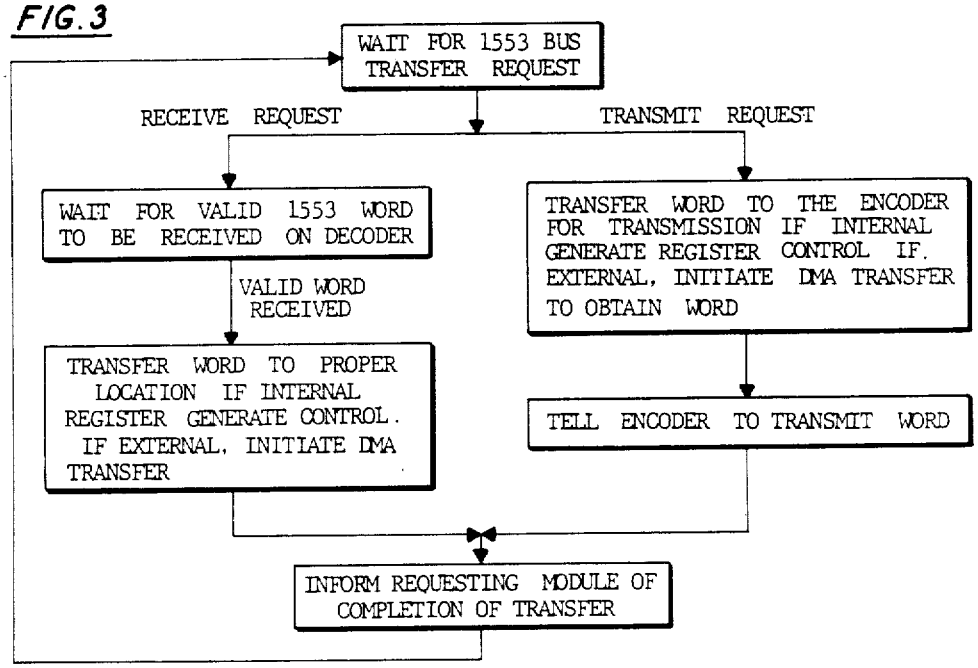
FIG. 3 illustrates the sequence of states of a module within a bus controller.

Referring now to FIG. 2, there is shown a block diagram of bus controller 100. On the left, encoder/decoder 102 converts parallel data to serial form and applies the conventional Manchester II coding scheme as required by the standard. Unit 102 is controlled in turn by bus control module 104, a simple finite state machine the sequence of which is shown in FIG. 3. The normal waiting state is at the top of the figure waiting for a request from the command block processor 110 to perform a bus transfer. If the transfer is a receive, unit 104 waits for a word to be received on decoder 102 and then transfers the word along an internal bus to either an internal register within unit 126 or unit 124 or to DMA sequencer 120 to be passed to host memory 20. If the order is for a word to be transmitted, the word is transferred from the internal register or from DMA sequencer to encoder 102 for transmission. At the end of the two branches, unit 104 passes a control signal back to the module that initiated the request and then resumes the wait state. Construction of finite state machines is well known to those skilled in the art and many different embodiments will do equally well.

On the right side of FIG. 2, DMA sequencer 120 performs a conventional DMA sequence, well known to those skilled in the art, in which, upon receipt of a control signal it initiates arbitration of the local bus shared by the CPU and memory 20, transmits an address and internal data path control signals to memory unit 20 and/or memory control logic 25. When the memory data has passed through bus 14 into DMA sequencer 120 and from there to the appropriate register within bus controller 100, then DMA sequencer 120 sends a completion signal back to the requesting module and resumes the waiting state. Data is received directly from the memory or written directly from the CPU on bus 14 which connects with a set of user registers 124 which may be accessed by the CPU and a set of internal registers 126 that are not user-accessible. Data moves between these registers and other modules within unit 100 under control of the main finite state machine, referred to as the command block processor 110.

As is known to those skilled in the art, a finite state machine may be implemented in a number of embodiments. such as a programmed logic array (PLA), or a ROM, which is a specialized PLA. The operation of the microcode in a microprocessor is an example of a finite state machine that is analogous to bus controller command block processor 110.

Subsidiary modules that provide optional features are interrupt handler 130 which responds to data received from the bus to set flags within an appropriate register and to initiate control signals to the CPU. These signals may enter the CPU through one of its interrupt channels or may reside within a register waiting for the CPU to interrogate a register, as is required by the system program that the CPU is executing. Timer 112 is a conventional clock that permits an improved feature of the subject invention compared to the prior art, in that block processor 110 can be programmed by the CPU to pause for a predetermined amount of time, which amount of time may be varied under stored program control, to exercise a series of message transfers and operations on the bus as required by the system program. For example, the system program may send a command through the bus controller to another unit on the bus. After the remote unit has had time to carry out the command, the bus controller may then execute a data transfer to store the resultant data in host memory, all without intervention by the CPU.

Figure 4:
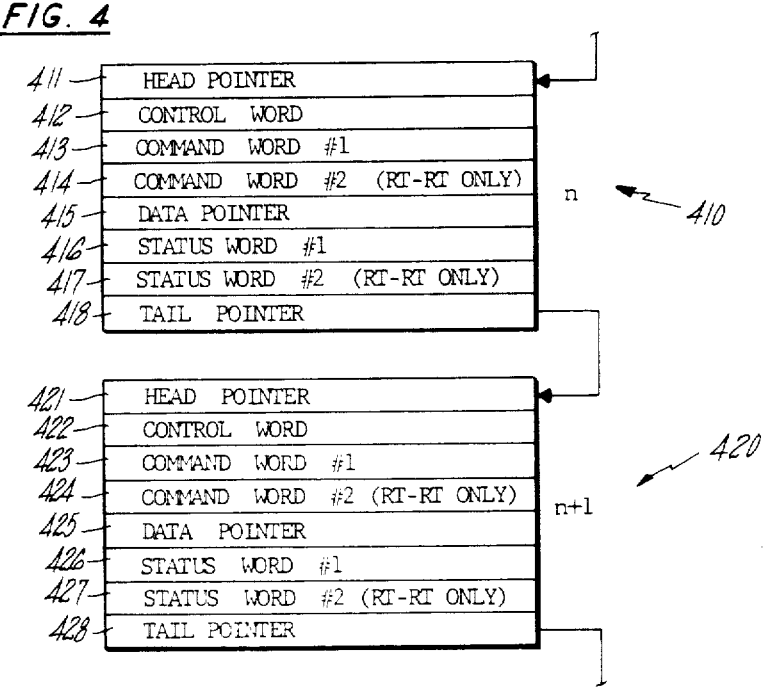
FIG. 4 illustrates the command block stored within host memory.

Referring now to FIG. 4, there is shown a portion of the host memory showing two blocks 410 and 420 of eight words each, the words within the blocks being numbered 411 through 418 and 421 to 428. Block 410 is the nth block in a chain of command blocks that is set up by the systems programmer and block 420 is the (n+1)th block. The bus controller will execute the command defined by the nth command block and then load the contents of word 418 which is a memory address pointing to the next (n+1) command block to be executed. The link is shown symbolically by an arrow connecting word 418 to word 421 in the drawing. With this approach, which is central to the invention, the systems programmer may define a series of commands to be executed, this series being as complex as his requirements dictate. In operation, the bus controller executes a DMA to fetch the contents of words 412, 413, and 415. The head pointer, word 411, has previously been stored in a register within the bus controller, either by the host CPU or by the process of reading the tail pointer (416 or 428) of a previous command block. The command word is a 1553 bus command which is set in a format dictated by the mil spec requirements. The control word contains information directing the bus controller in the manner in which it will manage the process of sending the command word out on the system bus and responding to whatever signal is returned.

Continuing with the description of command block n, word 414 is a second position for a second command word that is used only in the particular case in which there is a transfer between two remote terminals. Word 415 is a data pointer pointing to an area of host memory that contains data that is relevant to this command or where data will be stored. The two status words 416 and 417 have a format dictated also by the mil spec. The tail pointer, as previously described, contains the address in host memory of the next command block.

The control word is a 16 bit word written by the host CPU with bit selectable options for the bus controller. Bits 0 through 7 set a time delay between the beginning of this command block and the beginning of the execution of the next command block in sequence. Bit 8 provides an option to monitor the transfer of a message between two remote terminals. Bit 8 indicates that the message should be received and stored beginning at the location indicated by the data pointer in the command block being executed. Bit 9 is a flag indicating that the command block is a remote terminal to remote terminal transfer. Bit 10 is a flag indicating that the bus controller should halt and send an interrupt to the CPU after the execution of this command. Bit 11 enables the retry function to retry a command. Bit 12 enables a polling operation of the remote units by the bus controller without intervention from the CPU. Polling refers to bus controller interrogation of remote terminals by requesting transmission of their status words. The BCRT enables the host to initialize a chain of command blocks with the polling enable bit set. A polling compare register containing a word stored by the host also exists. The remote terminal response in the polling mode is compared to the contents of the Polling Compare Register. If the comparison results in any matching bits, a standard interrupt (if so enabled) is asserted. Bit 13 provides for an option in which the bus controller asserts an interrupt to the CPU and continues processing the list of messages. Bit 15 is a flag set by the bus controller indicating that there was an error in the execution of this command. Bit 14 indicates that this command block should be skipped and the next command block in sequence should be executed.

It will be evident that this system provides a rich variety of options for the systems programmer to offload a great burden from the CPU by initializing a message list of commands to be executed and alternative list sequences that the bus controller will be switched to on the occurrence of any of several anticipated conditions. For example, the basic list may be a standard pattern of interrogating the remote terminals with as many optional sequences as required.

By implementing a linked list message scheme, the subject invention enables the host CPU to easily implement transaction loops and message list moves as well as message scheduling routines. The invention accomplishes this by using internal state machines, timers and a linked pointer scheme implicit within the linked list message scheme.

Competitors' products; namely the DDC 66300/66305-65600 by ILC Data Device Corp. are inferior because they do not easily provide for message transaction loops, message list moves or message scheduling. The DDC product merely provides a method for message sequencing. In other words, with the DDC product, a host can simply set the messages to be transacted, in their respective order. There is no easy way to implement message schedules; it would be difficult to do message list jumps and impossible to do automatic message loops.

To exemplify this point, a typical message transfer sequence will be described for both products. The message transfer scenario will be as follows:
Three message lists A, B and C, each consisting of four messages. List A is to be executed at 10 Hz, List B at 20 Hz and List C at 30 Hz.

Figure 6:
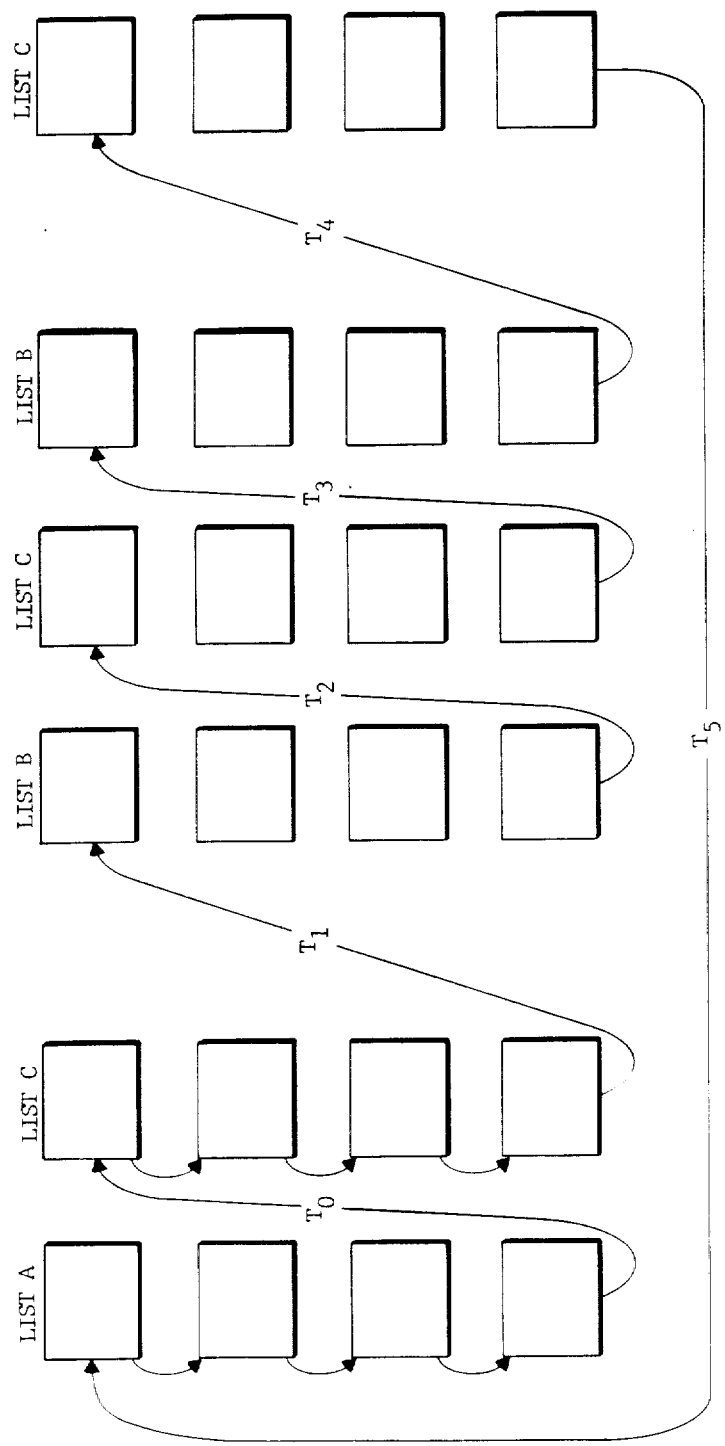
FIG. 6 illustrates an example of a message sequence carried out with the invention.

The BCRT can be set up to do so easily as shown in FIG. 6, which shows the area of memory containing the linked list of command blocks, with arrows indicating that the head and tail pointers carry the connection information. $T_0$ through $T_5$ are delay times that are set by the systems programmer to produce the desired timing.

Using the prior art DDC device to produce the same result without CPU intervention would be impossible and would be cumbersome because three separate linked lists cannot be set up.

Specifically, to do this with the DDC devices, three separate lists: A, B and C would need to be created. To execute them at different frequencies, the host CPU would have to do the following:
(0) After each first message list is executed
(1) Stop execution
(2) Start a timer
(3) Wait unit it times out
(4) Change message lists
(5) Wait until the second message list is executed
(6) Go back to step #2 and repeat Clearly, the subject invention offloads from the host CPU many of the tasks associated with this common application.

As another example, the remote terminal units may be configured to send a message to the bus controller that will cause as interrupt to the CPU which will branch to a message handling routine that will respond to whatever event caused the flag to be sent.

The above example may be modified by providing that an event, such as the identification of a hostile aircraft will cause the message sequence to add another list D to the sequence. In that case, the CPU will presumably be involved to make a decision to switch operating modes of the system. It may do so by merely resetting one tail pointer to pass control from the second occurrence of list C, say, to list D. List D will already have had its last tail pointer set to the second occurrence of list B, so that only the one change referred to above will alter the system operating mode. Those skilled in the art will readily be able to devise more complex variations of lists to satisfy their system needs with less interaction by the CPU than would be required if prior art devices were used.

Referring now to FIG. 5, there is shown a state diagram of the block processor 110 which is a finite state machine that controls the operation of the bus controller in response to the different states. In FIG. 5a, the default wait state is indicated by the block labeled idle, in which the bus controller is waiting for a command. To the left, the numeral 8 indicates a branch from a previous command block. The first operation block, which is a DMA execution, may be reached by a signal from the CPU to switch the bus controller from the idle state to execute a message or by a signal from the previous command block to continue executing the next block in sequence.

Figure 5A:
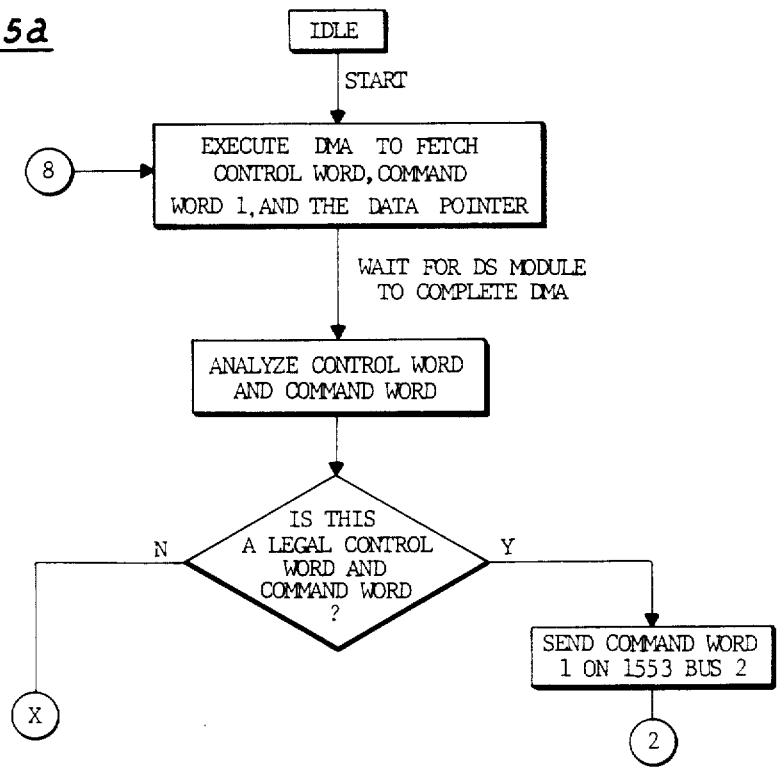
FIGS. 5a–5g illustrate the series of operations of the main sequence unit within the bus controller.
Figure 5B:
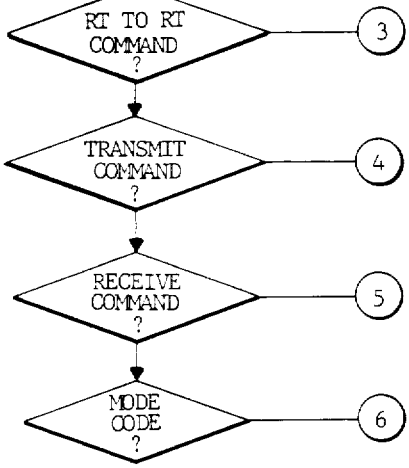
Figure 5C:
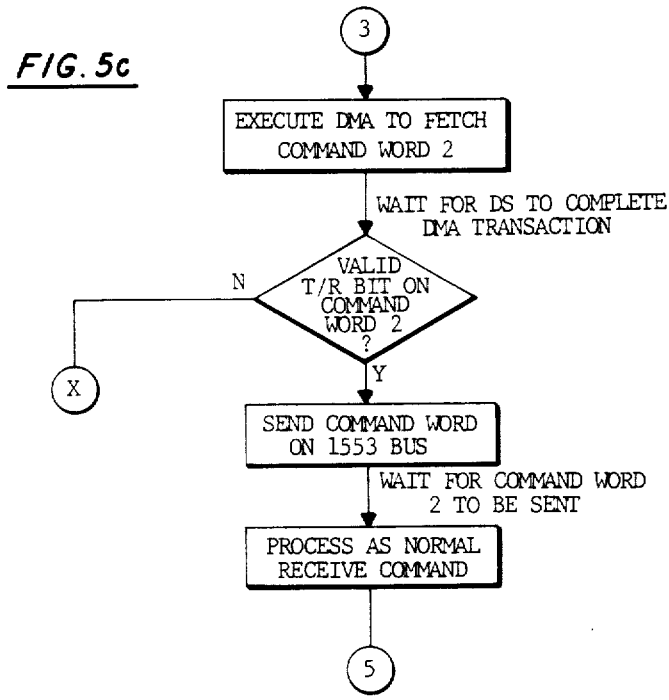
Figure 5D:
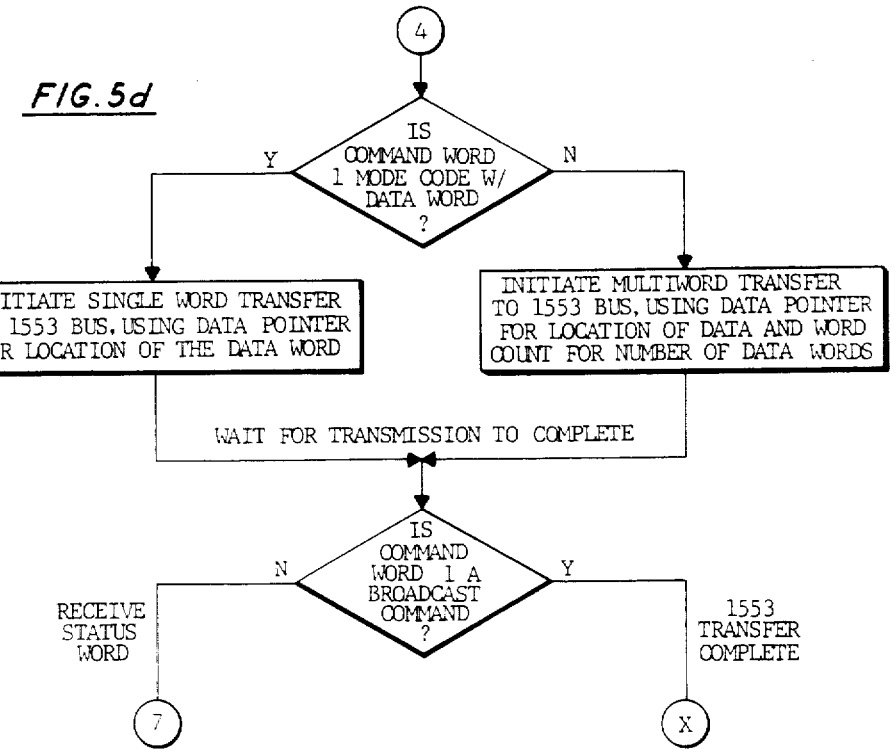

As described above, the bus controller executes a DMA to fetch the control word, the first command word and the data pointer. The second command word is not fetched at this time because it is not known if that command word will be used and it is desired to make response as fast as possible. The bus controller next checks only that the control word and the command word are acceptable and, if so, immediately sends the first command word out on the system bus in order to accomplish the message transfer in the shortest possible time. The symbol X indicates a branch to an interrupt/error sequence shown in FIG. 5g. The controller then checks the control word and first command word and branches to one of four branches, as shown in FIG. 5b depending upon whether the command is an RT to RT command, a transmit command, a receive command, or a mode code command. In the case where the command is between two RT's the second command word is then fetched and the series of steps shown in FIG. 5c are executed. This path then branches to the normal receive steps in FIG. 5e as described below. In the case of a transmit command, the steps as shown in FIG. 5d are executed with a branch for two forms of transfer single word and multi word and a further branch for a broadcast command.

Figure 5E:
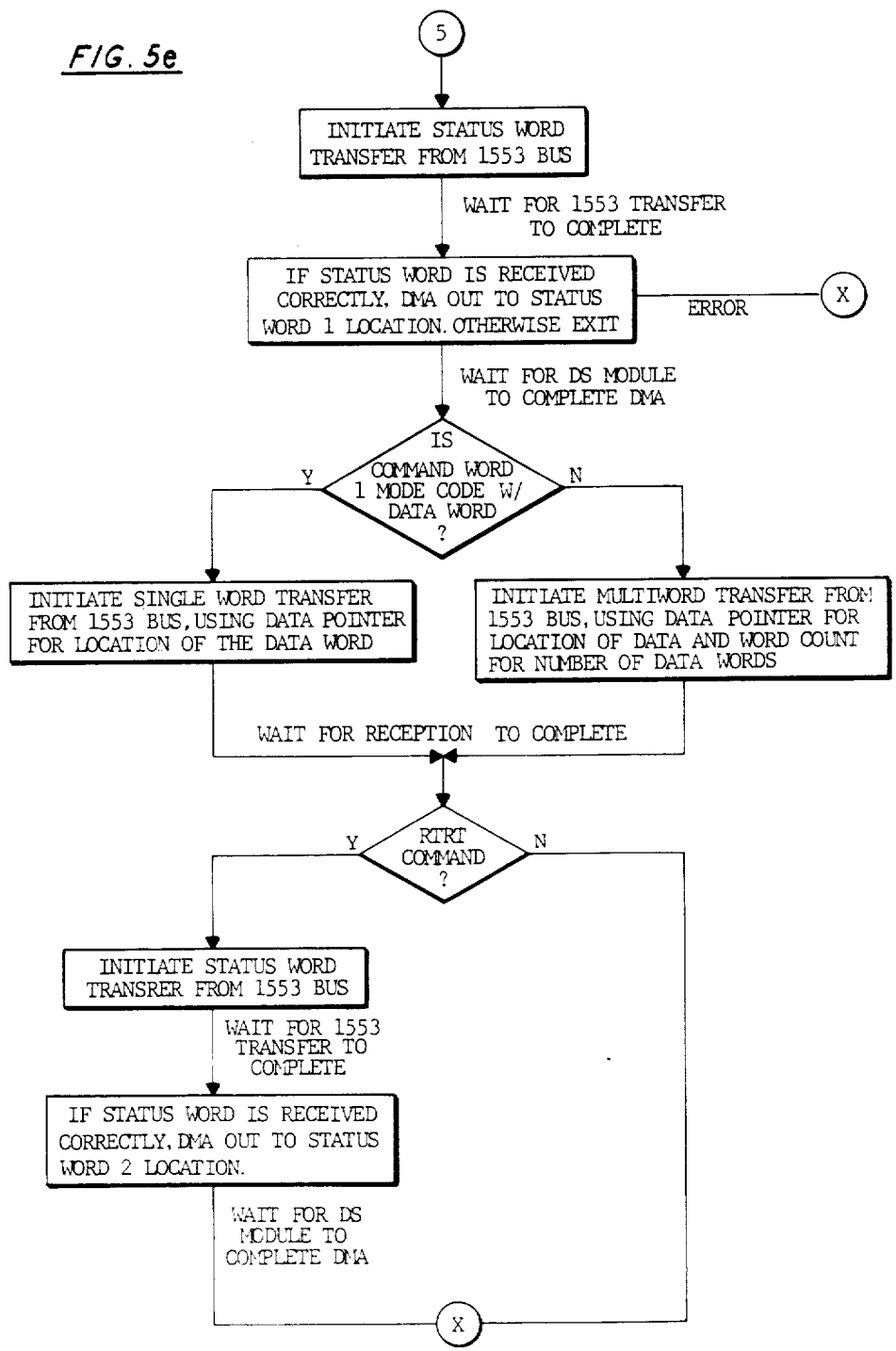
Figure 5F:
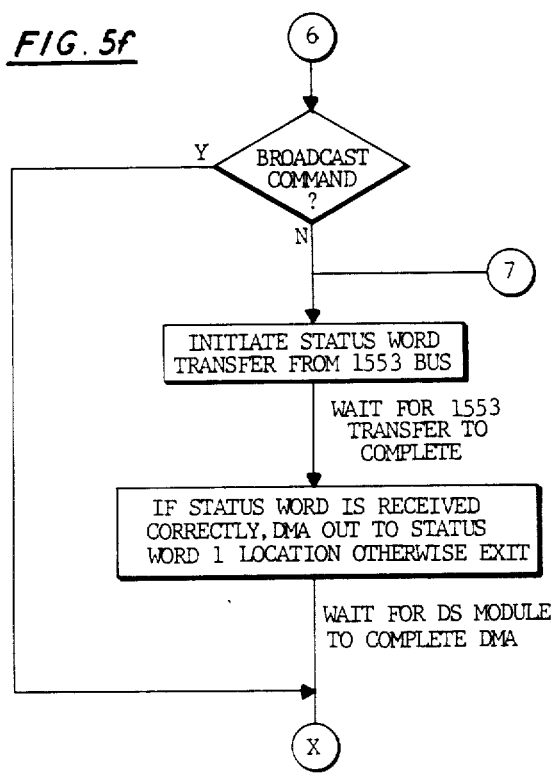
Figure 5G:
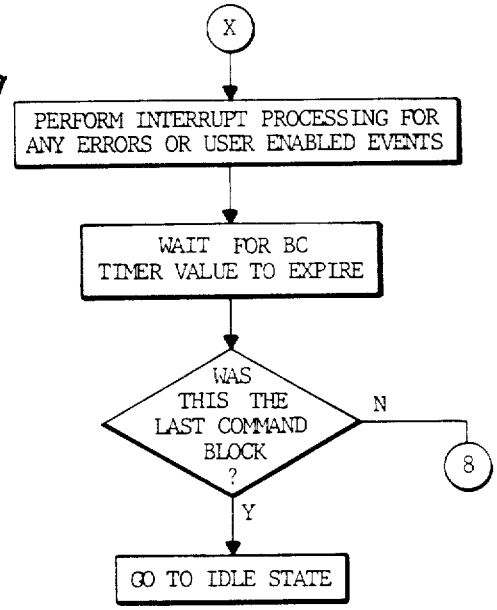

Referring now to FIG. 5e, the series of steps for a receive command is indicated. Since the command has been previously been put on the bus, the first step in this drawing is to load a response from the remote terminal from the bus into the bus controller. The status word is defined by the mil spec and will be processed by the CPU. The status word is loaded into the host memory in order that the CPU may access it when the system program calls for that, not in response to an interrupt from the bus controller. There are two further branches, depending upon whether the command was a mode code or an RT to RT command. The last form of command shown in FIG. 5f is a broadcast command in which the command is sent to all the remote terminals. FIG. 5g shows a series of steps to accomodate an error and to return control back to the start.

There is a further major feature of the embodiment described in FIG. 2. Unit 210, shown in dotted outline, is an optional finite state machine that controls the operation of the dual-purpose chip to perform similar bus interface functions for a remote terminal. Signal BCRTSEL determines the Bus Controller or Remote Terminal mode of operation. It can be overridden by using the BC/RT Mode Select bit in the Control register.

One advantage of this feature is that the systems program may be written to permit more than one unit to function as the bus controller at different times.

A further advantage is that the same layout and design work can be used for both versions, giving economies of scale. Most of the logical blocks are used in common, as is evident from FIG. 2.

The architecture of the remote terminal system is that a local CPU and local memory are connected to the BCRT chip as shown in FIG. 1. Within local memory, there is a descriptor space that contains a number of four-word blocks, of which three words are used. Two blocks referred to as descriptors are used for each sub-address, which is a field in the RT Command Word—one for transmit and one for receive. The descriptors are stored in local RAM in a list ordered sequentially by sub-address and initialized by the CPU to control the execution of a data transfer associated with that subaddress.

Each descriptor consists of four words, three of which are programmed by the CPU. These words indicate how to perform the data transfer associated with a designated sub-address.

Control Word—The first word in the descriptor is the control word. The control word is used to select or disable message transfers and to select an index.

BITs 0–6: Index. These bits are used by host for indexing messages. Indexing refers to having a pre-specified number (i.e., index) of messages transacted before the host CPU is notified. After each message transaction, the BCRT decrements the index by one. It can be used by the host to determine the number of messages executed or be notified when the specified quantity has transacted.

BIT 7: Interrupt when index=0. This bit is used by the host to indicate to the BCRT that an interrupt should be asserted when the index is decremented to zero.

BIT 8: Interrupt when addressed. Set by the host, this bit indicates to the BCRT that an interrupt should be asserted every time this descriptor is addressed.

BIT 9: Illegal sub-address. Set by the host, this bit indicates to the BCRT that this sub-address must not be accessed. The message error bit in the status word is set if the accessed sub-address is illegal.

BIT 10: Illegal broadcast sub-address. Set by the host, this bit indicates to the BCRT that this subaddress must not be accessed by broadcast commands. The message error bit in the status word is set if the illegal subaddress is addressed. Note that since transmit commands do not apply to broadcast, use of this bit only applies to receive commands.

BITs 11-15: For future expansion.

Data List Pointer—The Data List Pointer is the second word within the descriptor. This word is set by the host and used by the BCRT to store data in RAM beginning at the data list pointer address.

Message Status Pointer—This word, the third within the descriptor, is set by the host and used by the BCRT to store message status information in RAM beginning at the message status pointer.

Note: The fourth word is unused and available for future expansion.

Message Status Word—Each message transacted by the BCRT has a corresponding message status word. This word allows the host CPU to evaluate the message's validity, determine the word count, and calculate the approximate time frame in which the message is transacted.

BITs 0–7: Time tag. These are written by the BCRT after message completion. The resolution is sixty-four microseconds.

BITs 8–12: Word count. This indicates the number of words in the message and reflects the word count field in the command word. Should the message contain a different number of words than the word count field, the message error flag will be triggered. If there are excessive words they will be withheld from RAM. If the actual word count is less than it should be, the ME bit is set and the data pointer is incremented by the amount specified in the word count field.

BIT 13: Message error. This indicates the message is invalid due to improper sync, bit count, word count or Manchester error.

BIT 14: Broadcast message.

BIT 15: For future expansion.

Tables 1, 2 and 3, filed herewith, provide further hardware and software specification for the bus controller circuit described above.

Table 1 shows a list of the pins on the bus controller unit in two forms, that of a leadless chip carrier and a PGA. The signals, their type and the description are listed in a self explanatory fashion.

Table 2 shows a list of the internal registers of the bus controller.

Table 3 shows a list of internal registers that are not accessible to the user.

It should be understood that the invention is not limited to the particular embodiments shown and described herein, but that various changes and modifications may be made without departing from the spirit and scope of this novel concept as defined by the following claims.

TABLE 1

Signal List

| Name | Pin No. LCC | Pin No. PGA | Type | Active | Description |
|---|---|---|---|---|---|
| A0 | 34 | J10 | I/O | | Bit 0 (LSB) of the address bus |
| A1 | 35 | K11 | I/O | | Bit 1 of the address bus |
| A2 | 36 | J11 | I/O | | Bit 2 of the address bus |
| A3 | 37 | H10 | I/O | | Bit 3 of the address bus |
| A4 | 38 | H11 | OUT | | Bit 4 of the address bus |
| A5 | 39 | G9 | OUT | | Bit 5 of the address bus |
| A6 | 40 | G10 | OUT | | Bit 6 of the address bus |
| A7 | 41 | G11 | OUT | | Bit 7 of the address bus |
| A8 | 44 | E9 | OUT | | Bit 8 of the address bus |
| A9 | 45 | E11 | OUT | | Bit 9 of the address bus |
| A10 | 46 | E10 | OUT | | Bit 10 of the address bus |
| A11 | 47 | F11 | OUT | | Bit 11 of the address bus |
| A12 | 48 | D11 | OUT | | Bit 12 of the address bus |
| A13 | 49 | D10 | OUT | | Bit 13 of the address bus |
| A14 | 50 | C11 | OUT | | Bit 14 of the address bus |
| A15 | 51 | B11 | OUT | | Bit 15 (MSB) of the address bus |
| D0 | 9 | K11 | I/O | | Bit 0 (LSB) of the data bus |
| D1 | 8 | J1 | I/O | | Bit 1 of the data bus |
| D2 | 7 | H2 | I/O | | Bit 2 of the data bus |
| D3 | 6 | H1 | I/O | | Bit 3 of the data bus |
| D4 | 5 | G3 | I/O | | Bit 4 of the data bus |
| D5 | 4 | G1 | I/O | | Bit 5 of the data bus |
| D6 | 3 | G1 | I/O | | Bit 6 of the data bus |
| D7 | 2 | F1 | I/O | | Bit 7 of the data bus |
| D8 | 83 | E1 | I/O | | Bit 8 of the data bus |
| D9 | 82 | E2 | I/O | | Bit 9 of the data bus |
| D10 | 81 | F2 | I/O | | Bit 10 of the data bus |
| D11 | 80 | D1 | I/O | | Bit 11 of the data bus |
| D12 | 79 | D2 | I/O | | Bit 12 of the data bus |
| D13 | 78 | C1 | I/O | | Bit 13 of the data bus |
| D14 | 77 | B1 | I/O | | Bit 14 of the data bus |
| D15 | 76 | C2 | I/O | | Bit 15 (MSB) of the data bus |
| DMAR | 56 | A10 | OUT | AL | DMA Request. This signal is issued by the BCRT when access to RAM is required. It goes inactive following the receipt of a DMAG signal. |
| DMAG | 57 | A9 | IN | AL | DMA Grant. This input to the BCRT allows the BCRT to access RAM. It is recognized 45ns before the rising edge of MCLKD2. |
| DMAGO | 67 | B5 | OUT | AL | DMA Grant Out. If DMA Grant is received but not needed, it is passed through to this output. |
| DMACK | 58 | B8 | OUT | ZL | DMA Acknowledge. This signal is asserted by the BCRT to confirm receipt of DMA Grant; it stays low until memory access is complete. |
| RD | 61 | B7 | IN | AL | Read. This is used by the host, in conjunction with CS, to read an internal BCRT register. |
| WR | 60 | C7 | IN | AL | Write. This is used by the host in conjunction with CS, to write to an internal BCRT register. |
| RRD | 53 | A11 | OUT | AL | RAM Read. In the Pseudo-Duel-Port RAM mode, this is used by the host, in conjunction with MEMCSO, to read from external RAM through the BCRT. It is also the signal used by the BCRT to read from memory. It is asserted following receipt of DMAG. When the BCRT performs multiple reads, this signal is pulsed. |
| RWR | 52 | C10 | OUT | AL | RAM Write. In the Pseudo-Dual-Port RAM mode, this is used by both the CPU and the BCRT to write to external RAM. When used by the BCRT it is asserted following receipt of DMAG. For multiple writes, this signal is pulsed. |
| MEMCSI | 59 | A8 | IN | AL | Memory Chip Select In. Used in the Pseudo-Dual-Port RAM mode only, the |

TABLE 1-continued

Signal List

| Name | Pin No. LCC | PGA | Type | Active | Description |
|---|---|---|---|---|---|
| | | | | | Memory Chip Select Input signal is received from the host and is propagated through to MEMCSO. |
| MEMCSO | 54 | B10 | OUT | AL | Memory Chip Select Out. This is the regenerated MEMCSI input for external RAM during the Pseudo-Dual-Port RAM mode. It is also used by the BCRT to select external memory during memory accesses. |
| CS | 62 | A7 | IN | AL | Chip Select. This is used to select the BCRT when accessing the BCRT's internal registers. |
| TSCTL | 55 | B9 | OUT | AL | Three-State Control. This signal is used to indicate when the BCRT is actually accessing memory. The host subsystem's address and data lines should be in the high impedance state when the signal is active. It can be used to assist in placing the external data and address buffers in the high impedance state. |
| AEN | 66 | A5 | IN | AH | Address Enable. The host CPU uses AEN to indicate to the BCRT that the BCRT's address lines can now be asserted; this is a precautionary signal used to avoid address bus crash. If it is not used, it must be tied high. |
| STDINTL | 68 | A6 | OUT | ZL | Standard Interrupt (Level). This is a level interrupt. It is asserted when one or more events enabled in either the standard Interrupt Enable Register, RT Descriptor or BC Command Block occur. This is cleared by resetting the Standard Interrupt bit in the High Priority Interrupt Status/Reset Register. |
| STDINTP | 69 | A4 | OUT | AL | Standard Interrupt (Pulse). The pulse interrupt is asserted upon the same conditions as a level interrupt; a pulse will occur for each event occurrence. |
| HPINT | 70 | B4 | OUT | ZL | High Priority Interrupt. The high priority level interrupt is asserted upon occurrence of events enabled in the High Priority Interrupt Enable Register. It is reset using the corresponding bit in the High Priority Interrupt Status/Reset Register. |
| CLK | 21 | J5 | IN | | 12 MHz Input Clock. The duty cycle requirements are 50% and its accuracy must be greater than .01%. |
| MCLK | 65 | C5 | IN | | Memory Clock. This is the input clock frequency used by the BCRT for memory access. The memory cycle time is equal to two MCLK cycles. Therefore, this input frequency is proportional to the memory access time of RAM (12 MHz Maximum). (In choosing RAMs, a 12 MHz signal requires RAMs with a 100 ns maximum access time and an 8 MHz signal requires RAMs with a maximum access time of |

TABLE 1-continued

Signal List

| Name | Pin No. LCC | Pin No. PGA | Type | Active | Description |
|---|---|---|---|---|---|
| MCLKD2 | 71 | A3 | OUT | | 166ns.) Memory Clock Divided by Two. This signal is the Memory Clock input divided by two. It is used to assist the host subsystem in the synchronization of DMA events. |
| TAZ | 13 | K3 | OUT | | Transmit (Channel) A Z. TAZ and TAO are the two complementary Manchester encoder outputs to be connected to the transmitter inputs; both signals are idle low. |
| TAO | 14 | L2 | OUT | | Transmit (Channel) A O. Complementary Channel A Transmit. See TAZ. |
| TBZ | 17 | L4 | OUT | | Transmit (Channel) B Z. Same as TAZ, but for channel B. |
| TBO | 18 | K6 | OUT | | Transmit (Channel) B O. Complementary Channel B Transmit. (See TAZ) |
| RAZ | 15 | L3 | IN | | Receive (Channel) A Z. RAZ and RAO are the complementary Manchester inputs from the receiver. |
| RAO | 16 | K4 | IN | | Receive (Channel) A O. Complementary Channel A receive. (See RAZ) |
| RBZ | 19 | K5 | IN | | Receive (Channel) B Z. Same as RAZ for Channel B. |
| RBO | 20 | L5 | IN | | Receive (Channel) B O. Complementary Channel B receive. (See RAZ) |
| TIMERON | 25 | K7 | OUT | AL | (RT) Timer On. This is a 760 microsecond fail-safe enable timer. Started at the beginning of a transmission, TIMERON goes inactive 760 microseconds later or is reset automatically with the receipt of a new command. It is used in conjunction with channel A/B out to provide a fail-safe timer for channels A and B. |
| CHA/B | 26 | J7 | OUT | | Channel A/B. This indicates the active, or last active channel. |
| MRST | 10 | J2 | IN | AL | Master Reset. This resets all internal state machines, encoders, decoders, and registers. |
| COMSTR | 27 | L8 | OUT | AL | (RT) Command Strobe. This is activated on the receipt of a valid command; it is deactivated after the command is serviced. |
| BCRTSEL | 11 | L1 | IN | | BC/RT Select. This selects between either the Bus Controller or Remote Terminal mode of operation. It can be overridden by using the BC/RT Mode Select bit in the Control Register. This pin is internally pulled high. |
| RTA0 | 28 | K8 | IN | | Remote Terminal Address Bit 0 (LSB). The entire RT address is strobed in at Master Reset; it can be verified by reading the Remote Terminal Address Register. Note: All of the remote terminal address bits are internally pulled up. |
| RTA1 | 29 | L9 | IN | | Bit 1 of the remote terminal address. |
| RTA2 | 30 | L10 | IN | | Bit 3 of the remote terminal address. |
| RTA4 | 32 | L11 | IN | | Bit 4 (MSB) of the remote terminal address. |
| RTPTY | 33 | K10 | IN | | Remote Terminal |

TABLE 1-continued

Signal List

| Name | Pin No. LCC | Pin No. PGA | Type | Active | Description |
|---|---|---|---|---|---|
| | | | | | (Address) Parity. This is an odd parity input for the Remote Terminal Address. |
| SSYSF | 72 | A2 | IN | AH | Subsystem Fail. Upon receipt, this signal is propagated directly to the RT status word and the BCRT Status Register. |
| BCRTF | 75 | B2 | OUT | AH | BCRT Fail. This indicates a Built In Test (BIT) Failure. In the RT mode the Terminal Flag bit in the 1553 Status Word is also set. |
| BURST | 74 | A1 | OUT | AL | Burst (DMA Cycle). This indicates that the current DMA cycle will have at least two words transferred (worst case in five words). |
| MEMWIN | 73 | B3 | OUT | AL | Memory (Access) Window. This provides the host system with a clear time window for unimpeded memory access for at least 9 microseconds after MEMWIN goes inactive. (See DMA transfers). |
| LOCK | 12 | K2 | IN | AH | Lock. When set, this pin prevents internal changes to both the RT address and BC/RT mode select functions. This function is identical to the Change Lock-Out Enable function in the Remote Terminal Address Register. It is pulled up internally. |
| EXTOVR | 24 | L7 | IN | AL | External Override. Used in multi-redundant applications. Upon receipt, the BCRT aborts all current activity. Should be connected to COMSTR output of the adjacent BCRT when used. |
| | | | | | It is internally pulled up. |
| VDD | 23 | L6 | PWR | | +5V. |
| VDD | 43 | F9 | PWR | | +5v. |
| VDD | 64 | C6 | PWR | | +5V. |
| VDD | 84 | E3 | PWR | | +5V. |
| VSS | 1 | F3 | GND | | Ground. |
| VSS | 22 | J6 | GND | | Ground. |
| VSS | 42 | F10 | GND | | Ground. |
| VSS | 63 | B6 | GND | | Ground. |

NOTES:
1. Abbreviations
AL — Active Low
AH — Active High
ZL — Active Low, Inactive state is high impedance
2. Address and data buses are all active high and in the high impedance state when idle.

INTERNAL REGISTERS

Registers have been implemented to enable the CPU to control the actions of the BCRT while still maintaining low DMA overhead by the BCRT. All functions are active high and ignored when low unless otherwise mentioned. Functions/parameters are used in both RT and BC modes except where indicated. Registers are addressed by the binary equivalent of their decimal number—i.e. Register #1 is addressed as 0001B. All registers have read/write capability. Register usage is defined as follows:

0: Control Register

BIT 0: Start Enable. In the BC mode this bit starts/restarts command block execution. In the RT mode it enables the BCRT to receive a valid command. RT operation does not start until a valid command is received. When using this function, please note the following:

TABLE 2
INTERNAL REGISTERS (User—Accessible)

Registers have been implemented to enable the CPU to control the actions of the BCRT while still maintaining low DMA overhead by the BCRT. All functions are active high and ignored when low unless otherwise mentioned. Functions/parameters are used in both RT and BC modes except where indicated. Registers are addressed by the binary equivalent of their decimal number—i.e. Register #1 is addressed as 0001B. All registers have read/write capability. Register usage is defined as follows:

0: Control Register

BIT 0: Start Enable. In the BC mode this bit starts/restarts command block execution. In the RT mode it enables the BCRT to receive a valid command. RT operation does not start until a valid command is received. When using this function, please note the following:

The BCRT must be restarted after each Master Reset. This bit is not readable; verification of operation can be achieved using bit 0 of the BCRT's Status Register.

BIT 1: (BC) Retry on Busy. This bit enables automatic retry on a received busy bit in a RT status word response. (See section on Automatic Retry.)

BIT 2: (BC) Retry on Message Error. This bit enables an automatic retry when the message error bit is set in the RT's Status Word response.

BIT 3: (BC) Retry on Timeout. This bit enables an automatic retry on a response timeout condition.

BIT 4: (BC) Retry on Bus Controller Message Error. This bit enables automatic retries on an error detected by the bus controller. (See Bus Controller Architecture Section.)

BITs 5–6: (BC) Retry Count. These bits are used to program the number of retries to attempt (1–4). (00=1 retry, 11=4 retries)

BIT 7: (RT) Channel A Enable. (BC) Channel Select A/B

BIT 8: (RT) Channel B Enable.

BIT 9: (BC) Retry on Alternate Bus. This bit enables an automatic retry to operate on alternate busses. Eg., if on bus A, with two automatic retries programmed, the automatic retrys will occur on bus B.

BIT 10: BC/RT Select. This function selects between the Bus Controller and Remote Terminal operation modes. It will override the external BCRTSEL input setting if the Change Lock-Out function is not used.

BIT 11: Enable External Override. For use in multi-redundant systems. (See Pin Definition.)

BITS 12–15: Reserved

1: Status Register

The bits indicate the BCRT's current status.

BIT 0 (BC) Command block execution in progress. (RT) Remote terminal in operation.

BITS 1–4: Unused

BIT 5: Subsystem Fail Indicator. Indicates a subsystem fail signal from the host subsystem has been received on the SSYSF input.

BIT 6: Channel A/B. Indicates either the channel which is presently in use or the last channel used.

BIT 7: BC/RT. Indicates the current mode of operation.

BIT 8: Reset in progress.

BIT 9: Built-In-Test in progress.

BIT 10: Busy bit set in RT Status Word.

BIT 11: Service request bit set in Status Word.

BIT 12: Terminal flag bit set in Status Word.

BIT 13: Dynamic Bus Control Acceptance.

BIT 14: (RT) Remote Terminal Active. Indicates that the BCRT, in the remote terminal mode, is presently servicing a command.

BIT 15: Memory Window. This bit reflects the Memory Window output. It changes state simultaneously with the Memory Window.

2: Current Command Block Register (BC) This register contains the address of the command block currently being executed. It is updated with the access of a new Command Block.

(RT) Remote Terminal Descriptor Space Address Register. This is initialized by the host to indicate the starting location of the RT descriptor space. The host must allow 320 sequential locations following this starting address. NOTE: This location, for proper operation must start on a X512D address boundary. (Where "X" is an integer multiple.)

3: Polling Compare Register

In the polling mode, the Polling Compare Register is set by the CPU to indicate the RT response word on which the BCRT should interrupt. This register is eleven bits wide, corresponding to bits 9–19 of the RT's Status Word response. (i.e. The sync, Remote Terminal Address and parity bits are not included.) (See section on Polling.)

4 BIT (Built-In-Test) Word Register

This is written to by the BCRT in response to either an Initiate Self Test mode code (RT mode) or an Initiate Self Test bit in the Control Register. If the BIT Word needs to be modified; it can be read out, modified, then rewritten to this register.

BITS 0–13: Reserved (These are not reserved. They are there so that the user can make up any BIT word that he desires.)

BIT 14: Ch. A. Fail

BIT 15: Ch. B. Fail

5: Current Command Register

In either the RT or BC mode, this register contains the current command being executed. If the BCRT is not active, this register will contain the last command executed.

6: Interrupt Log List Pointer Register

Initialized by the CPU, the Interrupt Log List Pointer Register indicates the start of the Interrupt Log List. After each list entry, the BCRT updates this register with the address of where the next entry will be in the list.

7: High Priority Interrupt Enable Register (R/W)

Setting the bits in this register will cause a high priority interrupt when the enabled event occurs.

BIT 0: Standard Interrupt Enable. This bit enables the standard interrupt scheme. If set low, the standard interrupt level output is disabled.

BIT 1 (BC) Message Error Enable. If enabled, a high priority interrupt will be asserted at the occurrence of a message error.

BIT 2: (BC) End of Command Block List Enable. (See Command Block Control Word.)

BIT 3: BIT Word Fail Enable. This bit enables an interrupt indicating the detection occurrence of a Built-In-Test failure.

BIT 4: End of Built-In-Test Enable. This bit indicates the end of the internal Built-In-Test routine.

BIT 5: Subsystem Fail Enable. When set, a high priority interrupt is asserted upon receipt of a Subsystem Fail (SSYSF) input.

BIT 6: Dynamic Bus Control Acceptance Interrupt Enable. When set, in conjunction with the Dynamic Bus Control Enable bit in the Remote Terminal Address Register, an interrupt is asserted when dynamic bus control is accepted.

BIT 7: (BC) Illogical Command Error Enable. This bit enables a High Priority Interrupt to be asserted upon the occurrence of an Illogical Command. Illogical commands include all transmit broadcast commands.

BIT 8: Data Starvation Enable. When set, this bit enables an interrupt when DMAG was not received within the allotted time needed, by the BCRT, for a successful data transfer.

BITS 9–15: Reserved

8: High Priority Interrupt Status/Reset Register

When a high priority interrupt is asserted, this register will indicate the event that caused it. To clear the interrupt signal and reset the bit, a high signal should be written to the appropriate bit. See the corresponding bit definition of register #7. High Priority Interrupt Enable Register.

BIT 0: Standard Interrupt

BIT 1: BC Message Error

BIT 2: End of Command Block

BIT 3: BIT Word Fail

BIT 4: End of Built-In-Test
BIT 5: Subsystem Fail
BIT 6: Dynamic Bus Control Accepted
BIT 7: Illogical Command
BIT 8: Data (OVERFLOW? OVERRUN?)
BITS 9–15: Reserved

9: Standard Interrupt Enable Register

This register is used to enable the standard interrupt caused by any one of the following enabled events.

BIT 0: (BC) Command Block Interrupt and Continue. This bit enables an interrupt indicating that a Command Block, with the Interrupt and Continue Function enabled, has been executed.

BIT 1: (BC) Message Error Event. This bit enables a standard interrupt for message errors in the BC Mode.

BIT 2: (BC) Retry Fail. This bit enables an interrupt indicating that all of the programmed number of retries have failed.

BIT 3: (BC) Polling Comparison Fail. This enables an interrupt indicating that a polling "event" has occurred. (See Polling Section.)

BIT 4: (RT) Illegal Command. When set, this bit enables an interrupt indicating that an illegal command has been received.

BIT 5: (RT) Illegal (broadcast) Command. When set, this bit enables an interrupt indicating that an Illegal Broadcast Command has been received.

BITs 6–15: Reserved.

10: Remote Terminal Address Register

This register is used to set the Remote Terminal Address via software. The Change Lock-Out Enable feature, when set, prevents the Remote Terminal Address or the BC/RT mode selection from changing.

BITs 0–4: Remote Terminal Address (Bit 0 is the LSB). It is a reflection of the RTA0-4 inputs. The Remote Terminal Address, can be modified by writing to these bits.

BIT 5: Remote Terminal Address Parity. This is an odd parity input bit used with the Remote Terminal Address. It is used to insure accurate recognition of the Remote Terminal Address.

BIT 6: Remote Terminal Address Parity Error. This bit is used to indicate if there is a Remote Terminal Address Parity error. It will appear 170ns after the Remote Terminal Address is latched, if a parity error exists.

BIT 7: Change Lock-Out Enable. When set, changes cannot be made to the RT address or the BC/RT mode select using internal registers. NOTE: This bit's signal state, after reset, is reflected by the external pin LOCK.

BIT 8: BC/RT Mode Select. This bit reflects the setting of the external BC/RT signal.

BIT 9: (RT) Busy Enable. This bit enables the Status Word Busy Bit (in RT mode) and inhibits all data transfers to the subsystem. NOTE: The only possible DMA transfers are for the enabled events logged in the Interrupt Log List.

BIT 10: (RT) Service Request Enable. This bit enables the Status Word Service Request bit.

BIT 11: (RT) Terminal Flag Enable. This bit enables the 1553 Status Word Terminal Flag bit; the bit in the 1553 Status Word is also internally set if the Built-In-Test fails.

BIT 12: Subsystem Fail. This bit enables the subsystem bit in the 1553 Status Word and gos in in the RT message Status Word (if in the RT mode).

BIT 13: (RT) Dynamic Bus Control Enable. Enabling this bit allows the BCRT to accept Dynamic Bus Control and to set the appropriate bit in the Status Word.

BIT 14: Busy Enable. This bit enables the Busy Bit in the RT Status Word. It will not inhibit data transfers.

BIT 15: (RT) Instrumentation Bit. This function enables the Instrumentation Bit in the RT Status Word.

11: Built-In-Test Start Command

Any write (i.e. don't care) to this register's address location initiates the internal Built-In-Test routine. Verification can be achieved using the "Built-In-Test in Progress" bit in the Current Command Block Register.

12: Reset Start Command

Any write (i.e. don't care) to this register's address location initiates a reset of the encoder/decoder and protocol sections of the BCRT. This is identical to the reset used for the Reset Remote Terminal mode code. For a total reset (i.e. including registers), see Master Reset signal.

13: RT Timer Reset Command

Any write (i.e. don't care) to this register's address location resets the RT Time Tag timer to zero.

BITs 14–15: Reserved

TABLE 3

Internal BCRT Registers

The following registers are internal to the BCRT and are not available via standard register access.

1. Data Pointer Register

This register is used during command block processing to hold the data pointer from the command block area.

2. Bus Data Buffer Register

This register is used to hold data that is involved with 1553 data bus transfers. If a word is being received from the 1553 data bus, it will be placed here before being sent out via a DMA transfer. If a word is to be sent out onto the 1553 data bus, a DMA transaction will bring the word into the BCRT to this register before being sent out.

3. BC Status Word Register

When the BCRT is acting as a bus controller, any status received from an RT will be placed in this register. From this register, the status word will be transferred to appropriate command block location using DMA.

4. BC Control Word Register

When the Command Block DMA access to get the control word is performed, that word is placed in this register.

We claim:

1. A circuit for controlling a MIL-STD-1553 bus having at least two remote terminal units connected thereto and executing selected commands from a set of bus commands within a system having a host CPU and host memory and comprising;

a bus interface module means for transferring signals to and from said bus;

a CPU interface module means for passing signals to and from said CPU;

a memory interface module means for passing signals to and from said host memory;

at least one control register means for storing a control word;

at least one command register means for storing a command word;

a coding module means for coding and decoding said signals being transferred on or off said bus;

at least one control sequencer module means for executing a sequence of at least one operation in response to a state signal;

said CPU interface module means, memory interface module means, coding module means and sequencer module means and said control and command register means are formed within a single bus controller integrated circuit;

said memory interface module means contains means for performing a DMA sequence; and said at least one control sequencer module contains means for executing a series of command sequences in which:

(a) said bus controller integrated circuit accesses a selected command block of said host memory defined by a current block pointer and containing at least one subsequent pointer to at least one other command block area of said host memory, at least one control word containing control information for the execution of a current command sequence by said bus control circuit, at least one command word containing a conventional bus command to be transmitted over said bus, at least one location for storage of status information and at least one data pointer pointing to an area of host memory for the storage of data passing on or off said bus, said memory interface module means utilizing said data pointer for performing a direct memory access operation for passing data between said host memory and said bus controller integrated circuit, said control word and said command word being stored in said control register means and said command register means;

(b) said bus control circuit then executes said command sequence under control of path selection means, responsive to said control word and within said sequencer module means and in response to said control word, for the selection of one of at least two electrical paths extending from said bus interface module means through said coding module means to one of said CPU interface module means and said memory interface module means, whereby data, commands, and status information are passed through said bus control circuit to said host CPU or said host memory without intervention by said host CPU for path control and without intermediate storage in bulk memory located in said integrated circuit, and all commands and data required for standard bus operations are stored within said host memory; and (c) said bus control circuit then stores one of said at least one subsequent pointers as said current pointer, whereby said bus controller circuit executes a predetermined sequence of bus commands without control from said CPU.

2. An integrated circuit according to claim 1, further characterized in that said subsequent pointers of said series of command sequences form a set of command block pointers a selected one of which points to a previous command block in said series of command sequences, whereby said integrated circuit executes said predetermined series of bus commands repeatedly.

3. An integrated circuit according to claim 2, further characterized in that said series of commands is a series of interrogations of a predetermined set of remote terminals in a predetermined order, whereby said series of commands forms a polling sequence.

4. An integrated circuit according to claim 1, further characterized in that an nth command block includes a parameter for specifying a delay between the execution of an nth command in said series associated with said nth command block and the execution of an (n+1)th command in said series.

5. An integrated circuit according to claim 1, further characterized in that said integrated circuit includes a register for storing a predetermined bit pattern and comparison means for comparing a remote terminal response with said bit pattern.

6. An integrated circuit according to claim 5, further characterized in that said bus control integrated circuit includes means for sending an interrupt to said CPU upon the occurence of a predetermined pattern match between a portion of said predetermined bit pattern and said remote terminal response.

7. An integrated circuit according to claim 1, further characterized in that said bus controller integrated circuit contains a remote terminal sequencer module for executing a series of at least one operation in response to a state signal including a remote message transfer operation in response to a signal from a bus controller unit on said bus and a chip mode control unit for enabling either said at least one sequencer module or said remote terminal sequencer module, whereby said bus controller integrated circuit may function as part of a bus controller or as part of a remote terminal, in accordance with a state of said chip mode control unit.

8. An integrated circuit according to claim 7, further characterized in that said circuit includes remote terminal control means operational in a remote terminal mode, for transacting a predetermined number of remote terminal operations without communication with said host CPU.

9. An integrated circuit according a claim 8, further characterized in that said remote terminal control means includes means for sending an interrupt over said bus to said host CPU upon the occurence of a specified condition.

10. An integrated circuit according to claim 7, further characterized in that said remote terminal control means includes means responsive to a predetermined bit pattern on said bus to access a predetermined remote terminal command block associates with said predetermined bit pattern and stored in local memory connected to said integrated circuit, whereby said integrated circuit may execute one of at least two applications specific commands stored in local memory and associated with said predetermined bit pattern.

* * * * *